(12) United States Patent
Chen et al.

(10) Patent No.: US 8,888,622 B2
(45) Date of Patent: Nov. 18, 2014

(54) ISOLATOR DECOUPLER

(75) Inventors: Xiaohua Joe Chen, Windsor (CA); John T. Harvey, Novi, MI (US); Rudy Pupulin, Tecumseh (CA); Keming Liu, Sterling Heights, MI (US); Alexander Serkh, Troy, MI (US); Imtiaz Ali, Lathrup Village, MI (US); Dean Schneider, Washington, MI (US); Peter Ward, Farmington Hills, MI (US)

(73) Assignee: The Gates Corporation, Denver, CO (US)

( * ) Notice: Subject to any disclaimer, the term of this patent is extended or adjusted under 35 U.S.C. 154(b) by 365 days.

(21) Appl. No.: 13/487,755

(22) Filed: Jun. 4, 2012

(65) Prior Publication Data

US 2013/0324335 A1     Dec. 5, 2013

(51) Int. Cl.
| F16D 3/00 | (2006.01) |
| F16H 55/14 | (2006.01) |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |

(52) U.S. Cl.
USPC ............................................. 474/94; 474/74

(58) Field of Classification Search
USPC ...................................................... 474/94, 74
See application file for complete search history.

(56) References Cited

U.S. PATENT DOCUMENTS

| 3,968,702 | A | 7/1976 | Beaudoin et al. |
| 4,095,479 | A | 6/1978 | Lundberg |
| 4,102,214 | A | 7/1978 | Hoff |
| 4,943,264 | A | 7/1990 | Whiteman, Jr. |
| 5,052,981 | A | 10/1991 | Robert |
| 5,139,463 | A | 8/1992 | Bytzek et al. |
| 5,149,309 | A | 9/1992 | Guimbretiere |
| 5,156,573 | A | * | 10/1992 | Bytzek et al. | .................... 474/74 |
| 5,326,330 | A | 7/1994 | Bostelmann |
| 5,598,913 | A | 2/1997 | Monahan et al. |
| 6,044,943 | A | 4/2000 | Bytzek et al. |
| 6,083,130 | A | * | 7/2000 | Mevissen et al. | ............... 474/70 |
| 6,394,248 | B1 | 5/2002 | Monahan et al. |
| 6,761,656 | B2 | 7/2004 | King et al. |
| 6,923,303 | B2 | 8/2005 | Liston et al. |
| 7,007,780 | B2 | 3/2006 | Arnold et al. |

(Continued)

FOREIGN PATENT DOCUMENTS

| WO | 2005/057037 A1 | 6/2005 |
| WO | 2011160208 A1 | 12/2011 |

OTHER PUBLICATIONS

European Patent Office, International Search Report, Mailing date Sep. 18, 2013.

*Primary Examiner* — Henry Liu
(74) *Attorney, Agent, or Firm* — Jeffrey A. Thurnau, Esq.; Paul N. Dunlap, Esq.

(57) ABSTRACT

An isolator decoupler comprising a shaft, a pulley journalled to the shaft, a clutch carrier journalled to the shaft through a one-way clutch, a torsion spring engaged between the pulley and the clutch carrier, the torsion spring loadable in an unwinding direction, the torsion spring and the pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring.

3 Claims, 4 Drawing Sheets

(56) References Cited

U.S. PATENT DOCUMENTS

| | | | |
|---|---|---|---|
| 7,052,420 B2 * | 5/2006 | King et al. | 474/74 |
| 7,153,227 B2 * | 12/2006 | Dell et al. | 474/70 |
| 7,207,910 B2 * | 4/2007 | Dell et al. | 474/74 |
| 7,618,337 B2 | 11/2009 | Jansen et al. | |
| 7,712,592 B2 | 5/2010 | Jansen et al. | |
| 7,766,774 B2 | 8/2010 | Antchak et al. | |
| 7,850,557 B2 * | 12/2010 | Moriya et al. | 474/94 |
| 7,878,315 B2 * | 2/2011 | Saito et al. | 192/41 S |
| 7,975,821 B2 | 7/2011 | Antchak et al. | |
| 8,006,819 B2 | 8/2011 | Dell et al. | |
| 8,021,253 B2 * | 9/2011 | Dell et al. | 474/74 |
| 8,177,669 B2 * | 5/2012 | Ishida et al. | 474/94 |
| 8,192,312 B2 * | 6/2012 | Ali et al. | 474/94 |
| 8,419,574 B2 * | 4/2013 | Serkh et al. | 474/94 |
| 8,506,434 B2 * | 8/2013 | Harvey | 474/94 |
| 8,602,928 B2 * | 12/2013 | Serkh et al. | 474/70 |
| 8,678,157 B2 * | 3/2014 | Ward et al. | 192/55.1 |
| 2002/0183147 A1 * | 12/2002 | Fujiwara | 474/70 |
| 2006/0035740 A1 * | 2/2006 | Lehtovaara et al. | 474/237 |
| 2006/0144664 A1 * | 7/2006 | Antchak et al. | 192/41 S |
| 2006/0264280 A1 * | 11/2006 | Dell et al. | 474/70 |
| 2008/0207364 A1 * | 8/2008 | Schebitz et al. | 474/94 |
| 2009/0176583 A1 * | 7/2009 | Dell et al. | 464/40 |
| 2009/0176608 A1 * | 7/2009 | Jansen et al. | 474/74 |
| 2009/0197719 A1 * | 8/2009 | Ali et al. | 474/94 |
| 2010/0116617 A1 | 5/2010 | Serkh et al. | |
| 2011/0065537 A1 * | 3/2011 | Serkh et al. | 474/94 |
| 2011/0224038 A1 * | 9/2011 | Aantchak et al. | 474/94 |
| 2011/0245000 A1 * | 10/2011 | Serkh et al. | 474/94 |
| 2012/0088616 A1 * | 4/2012 | Ali et al. | 474/94 |
| 2013/0150191 A1 * | 6/2013 | Ishida | 474/94 |

* cited by examiner

ISOLATOR DECOUPLER

FIELD OF THE INVENTION

The invention relates to an isolator decoupler having a torsion spring and pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 7,766,774 which discloses a decoupler assembly for allowing an alternator to be rotatably driven by a serpentine belt in an engine of an automotive vehicle and for allowing the speed of the belt to oscillate relative to the alternator. A hub is fixedly carried by a drive shaft from the alternator for rotation therewith. A pulley is rotatably journalled to the hub by a ball bearing assembly. A bare, helical clutch spring is operatively coupled between the hub and pulley for transferring rotational movement from the pulley to the hub during acceleration of the pulley relative to the hub by the serpentine belt and for allowing the hub to overrun the pulley during deceleration of the pulley relative to the hub. A torque limiter, preferably a spring or sleeve, is wrapped about the torsion limiting outward expansion of the torsion isolating the torsion spring from torques above a predetermined limit.

What is needed is an isolator decoupler having a torsion spring and pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring. The present invention meets this need.

SUMMARY OF THE INVENTION

The primary aspect of the invention is an isolator decoupler having a torsion spring and pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring.

Other aspects of the invention will be pointed out or made obvious by the following description of the invention and the accompanying drawings.

The invention comprises an isolator decoupler comprising a shaft, a pulley journalled to the shaft, a clutch carrier journalled to the shaft through a one-way clutch, a torsion spring engaged between the pulley and the clutch carrier, the torsion spring loadable in an unwinding direction, the torsion spring and the pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
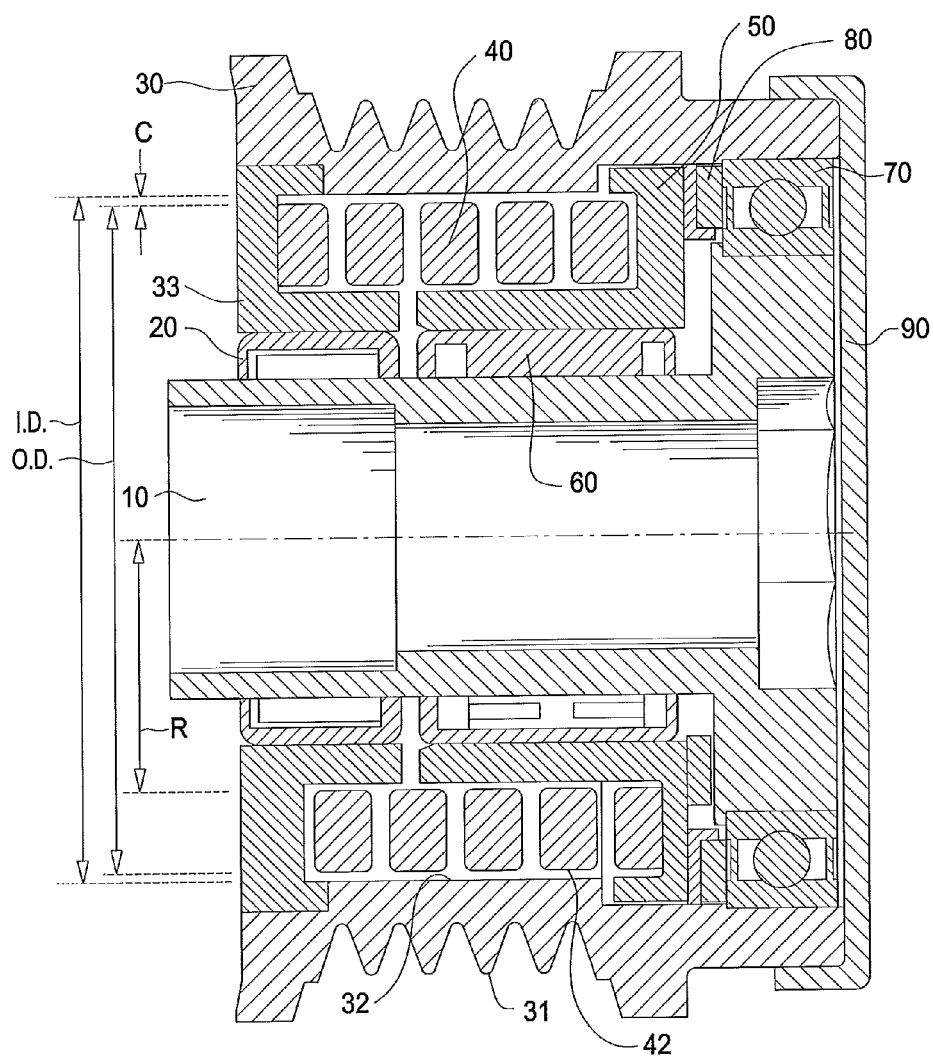
FIG. 1 is a cross section view of the inventive device.

FIG. 1 is a cross section view of the inventive device. The isolator decoupler comprises a shaft 10. Pulley 30 is journalled to shaft 10 by a needle bearing 20 disposed between the pulley 30 and the shaft 10. A torsion spring 40 is engaged between pulley 30 and clutch carrier 50. Clutch carrier 50 is journalled to shaft 10 through a one-way clutch 60. For example, the spring rate for spring 40 is approximately 0.27 Nm/deg, although other spring rates may be selected by a user to suit the operational requirements of the device.

Pulley 30 is further journalled to shaft 10 by a bearing 70 which is disposed between pulley 30 and shaft 10.

A thrust bushing 80 is disposed between clutch carrier 50 and bearing 70. Dust cover 90 prevents debris from entering the device. Cover 33 is press fit to pulley 30. An end of spring 40 engages receiving portion 34 of cover 33.

In operation for either an engine acceleration or steady speed, spring 40 is loaded in the unwinding direction and the one-way clutch 60 is locked. Power is transmitted from a belt (not shown) to pulley 30 through spring 40, clutch carrier 50 and one-way clutch 60 to shaft 10. While it is loaded in a driving direction spring 40 is trying to unwind and as a result the spring outside diameter (OD) surface 42 expands radially outward by an increase in the radius of each spring volute (R). The maximum extent of unwinding of spring 40 is limited as each spring 40 volute outside diameter surface 42 which progressively comes into contact with the pulley 30 inside diameter (ID) surface 32. The extent of unwinding is dependent upon the torque load applied, hence, as the torque load is increased the amount of spring surface 42 in contact with surface 32 progressively increases, and as the torque load decreases the amount of spring surface 42 in contact with surface 32 progressively decreases.

The clearance between the spring outside diameter and the pulley inside diameter (C) determines and limits the unwinding radial expansion of spring 40, which in turn protects spring 40 from being overloaded. At full lock up, that is when spring surface 42 is fully expanded into contact with the surface 32, spring 40 is fully confined within the pulley surface 32 thereby preventing damage even if the applied torque load continues to increase.

In an engine deceleration condition the driving belt (not shown) will slow and so will the pulley 30, but, due to its inertia an alternator (not shown) connected to shaft 10 would not in most cases drop RPM's as quickly as the pulley 30. In effect the alternator would be trying to drive the engine (not shown) and the power flow would be reversed. This could overspeed the system and cause belt chirp as the belt slips on the pulley. Using the inventive device, the difference in deceleration rates will cause the one-way clutch to decouple the overrotating shaft 10 from pulley 30. The alternator and shaft 10 will continue to decelerate at its own rate until it approximately matches the speed of the pulley 30 at which time the one-way clutch 60 will reengage. Uncoupling in this manner prevents shocks from being applied to the belt system as the engine accelerates and decelerates during normal use.

Figure 2:
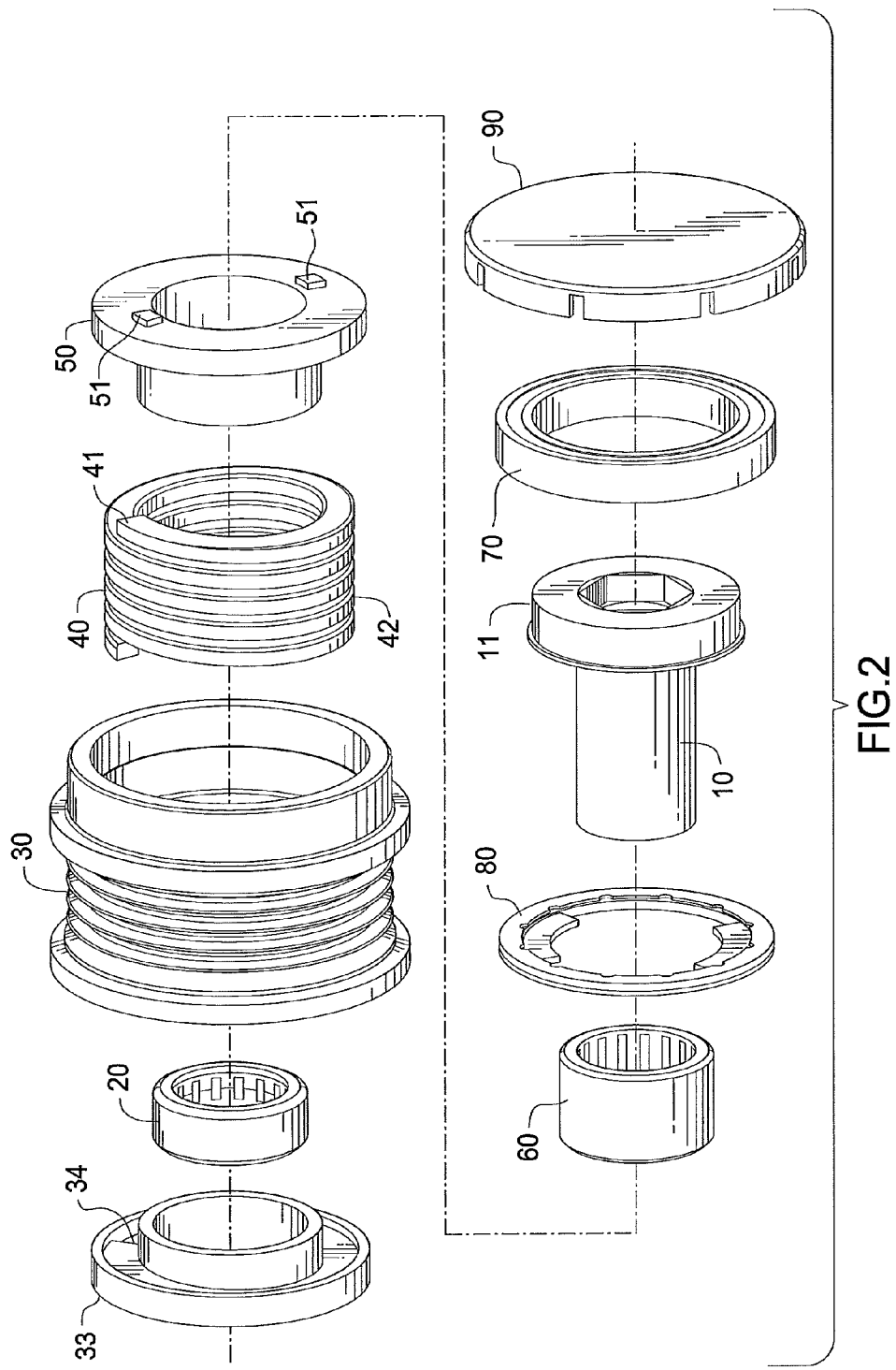
FIG. 2 is an exploded view.

FIG. 2 is an exploded view. Thrust bushing 80 is press fit into the inside diameter of pulley 30. Bearing 70 engages a collar 11 of shaft 10. Dust cover 90 snaps onto pulley 30. One-way clutch 60 has an axial sliding fit to shaft 10 and will lock up on a torque reversal. Clutch carrier 50 is press fit to one-way clutch 60. Torsion spring 40 volutes have a rectangular cross-section. The rectangular cross section increases the surface area available to contact the inner diameter of the pulley. Bearing 20 is a sliding fit to shaft 10.

Thrust bearing 80 engages bearing 70 to prevent axial movement of pulley 30 and clutch carrier 50.

Figures 3, 4:
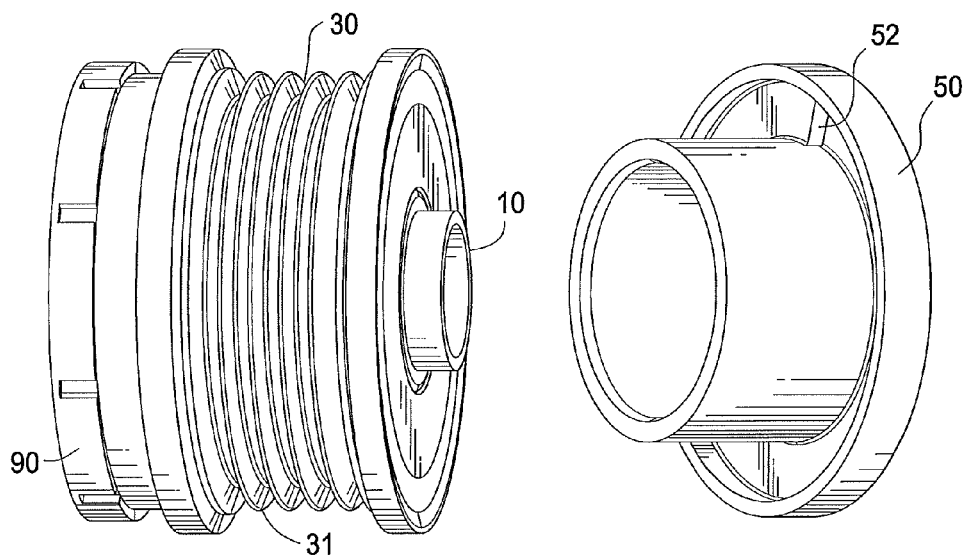
FIG. 3 is a side view of the inventive device.
FIG. 4 is a detail of the clutch carrier.

FIG. 3 is a side view of the inventive device. Pulley engaging surface 31 is a multiple ribbed surface, but can accommodate any surface form including toothed, smooth or single V groove.

FIG. 4 is a detail of the clutch carrier. Spring receiving portion 52 receives an end of torsion spring 41 when the device is being operated in the driving direction.

Figure 5:
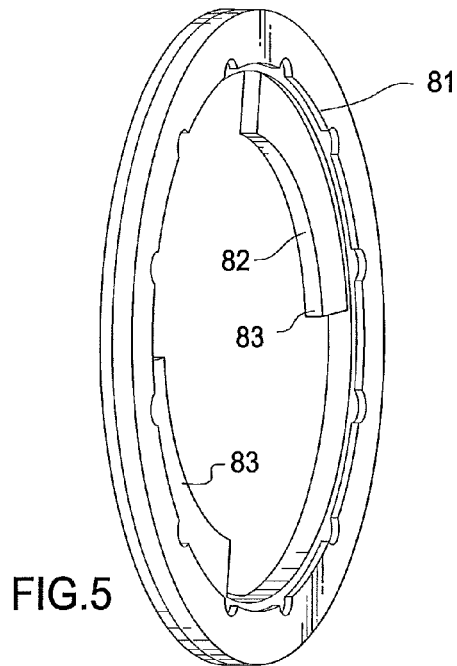
FIG. 5 is a detail of the thrust bushing.

FIG. 5 is a detail of the thrust bushing. Thrust bushing 80 comprises a steel ring that is press fit into the pulley inside diameter. Thrust bushing 80 comprises plastic 81 overmolded on the steel ring 82.

The thrust bushing sliding surface 81 comprises stops 83 which engage with stops 51 on the clutch carrier 50. When the loaded spring is released during operation the thrust bushing will limit spring and clutch carrier reverse travel by contact between stops 83 and stops 51 thereby preventing spring end 41 from slipping out of the spring hookup slot 52 in the clutch carrier 50. Further, engagement of the stops limits a relative rotation of the clutch carrier, and thereby the torsion spring with respect to the pulley.

The device is manufactured as follows. The pulley ID is with a +−0.015 mm tolerance. The spring OD is ground with a tolerance +/−0.03 mm. During assembly grease is applied between the spring OD 42 and the pulley ID 32 to soften engagement of stops 51 and 83. For example, given a spring OD=42 mm, during start up the spring OD will expand approximately 0.024 mm per degree.

During assembly thrust bushing 81 is installed so that stops 83 engage clutch carrier stops 51. The function of the stops 83, 51 is to prevent the spring end 41 from slipping out from portion 52 during a spring energy release or load reversal. The stops are not intended to give any preload to spring 40 and are not in contact during a no load condition for the device. However, due to assembly process variations, the assembled device may have a negligible preload or very small gap between the stops 83, 51 or spring end receiving portion which can be adjusted during assembly process.

Figure 6:
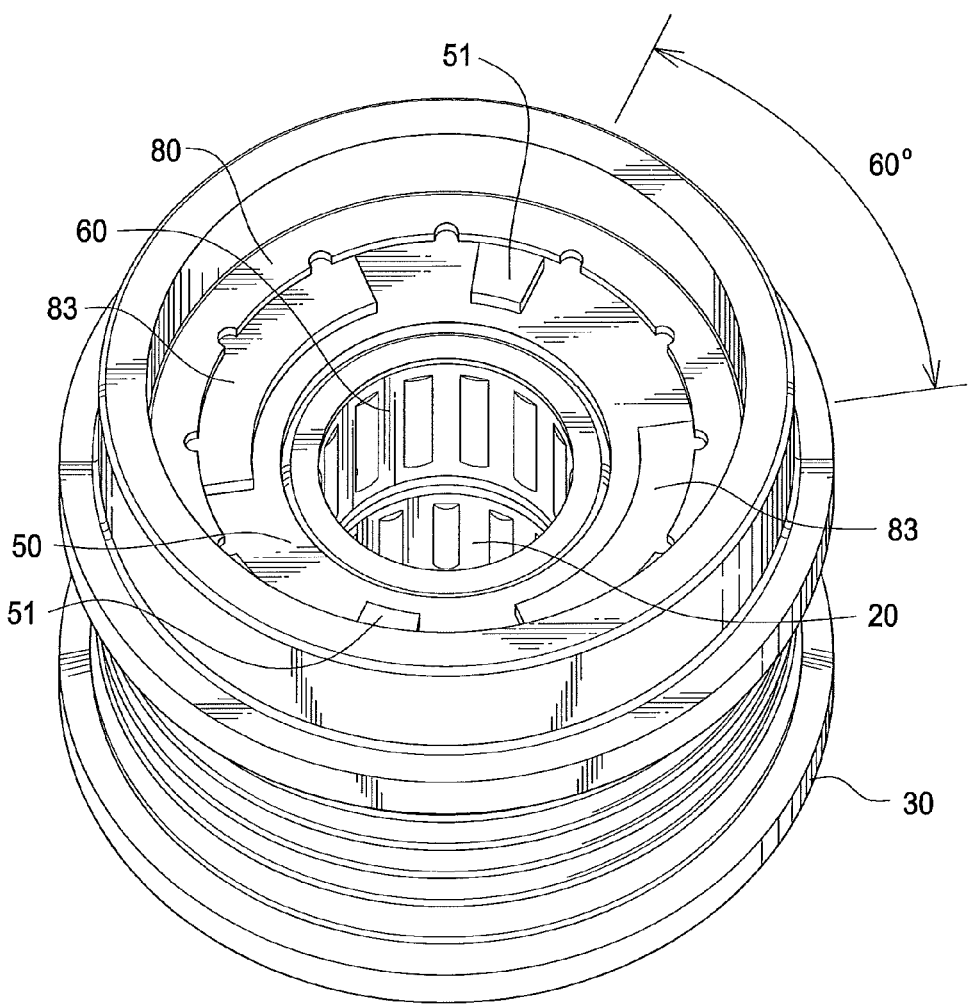
FIG. 6 is a persepctive view of the thrust bushing and clutch carrier stops.

During start up the clutch carrier 50 and clutch carrier stop 51 will deflect approximately 60 degrees from its unloaded engagement position with the thrust bushing stop 83. FIG. 6 is a persepctive view of the thrust bushing and clutch carrier stops.

Although a form of the invention has been described herein, it will be obvious to those skilled in the art that variations may be made in the construction and relation of parts without departing from the spirit and scope of the invention described herein.

We claim:

1. An isolator decoupler comprising:
a shaft;
a pulley journalled to the shaft;
a clutch carrier journalled to the shaft through a one-way clutch, the one-way clutch engaged to the shaft;
a torsion spring engaged between the pulley and the clutch carrier;
a thrust bushing fixed to the pulley and disposed between the clutch carrier and the shaft, the thrust bushing having a thrust bushing stop and the clutch carrier having a clutch carrier stop, the thrust bushing stop and the clutch carrier stop engagable during a no load condition such that the torsion spring will not disengage from the clutch carrier;
the torsion spring loadable in an unwinding direction;
the torsion spring and the pulley having a predetermined clearance between a torsion spring outside diameter surface and a pulley inside diameter surface; and
whereby the torsion spring outside diameter surface and a pulley inside diameter surface come into a progressive frictional engagement by torque load dependent radial expansion of the torsion spring.

2. The isolator decoupler as in claim 1, wherein the pulley is journalled to the shaft through a needle bearing.

3. An isolator decoupler comprising:
a shaft;
a pulley journalled to the shaft;
a clutch carrier journalled to the shaft through a one-way clutch;
a torsion spring engaged with the pulley and the clutch carrier;
a thrust bushing connected to the pulley and disposed between the clutch carrier and the shaft, the thrust bushing comprises a stop;
the clutch carrier comprises a stop that is cooperatively engageable with the thrust bushing stop to limit a relative rotation of the clutch carrier with respect to the pulley such that during a load release condition the torsion spring will not disengage from the clutch carrier;
the torsion spring loadable in an unwinding direction;
the torsion spring and the pulley having a predetermined clearance between a torsion spring outside diameter surface and a pulley inside diameter surface; and
whereby the torsion spring outside diameter surface and a pulley inside diameter surface come into a progressive frictional engagement by torque load dependent radial expansion of the torsion spring.

* * * * *